(12) United States Patent
Kingsbury et al.

(10) Patent No.: US 11,494,190 B2
(45) Date of Patent: Nov. 8, 2022

(54) CIRCUITRY AND METHOD FOR CONTROLLING A GENERATED ASSOCIATION OF A PHYSICAL REGISTER WITH A PREDICATED PROCESSING OPERATION BASED ON PREDICATE DATA STATE

(71) Applicant: Arm Limited, Cambridge (GB)

(72) Inventors: Zachary Allen Kingsbury, Austin, TX (US); Kurt Matthew Fellows, Austin, TX (US); Thomas Gilles Tarridec, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/218,371

(22) Filed: Mar. 31, 2021

(65) Prior Publication Data

US 2022/0318016 A1    Oct. 6, 2022

(51) Int. Cl.
*G06F 9/38* (2018.01)
*G06F 9/30* (2018.01)

(52) U.S. Cl.
CPC .......... *G06F 9/384* (2013.01); *G06F 9/30018* (2013.01); *G06F 9/30032* (2013.01); *G06F 9/30036* (2013.01)

(58) Field of Classification Search
CPC .. G06F 9/384; G06F 9/30072; G06F 9/30018; G06F 9/30036
See application file for complete search history.

(56) References Cited

U.S. PATENT DOCUMENTS

| 2001/0004755 A1* | 6/2001 | Levy | G06F 9/3857 |
| | | | 712/217 |
| 2008/0177983 A1* | 7/2008 | Piry | G06F 9/3842 |
| | | | 712/E9.05 |

(Continued)

OTHER PUBLICATIONS

Robert Bedichek, "Some Efficient Architecture Simulation Techniques," Proceedings of the Winter 1990 USENIX Conference, Jan. 22-26, 1990, 12 pages.

(Continued)

*Primary Examiner* — Keith E Vicary
(74) *Attorney, Agent, or Firm* — Nixon & Vanderhye P.C.

(57) ABSTRACT

Instruction decoder circuitry decodes processing instructions each generating an output multi-bit data item in a destination architectural register by applying a processing operation to source data item(s) in respective source architectural register(s). The decoder circuitry detects whether an instruction defines a predicated merge operation that propagates a set of zero or more portions of the prevailing contents of the destination architectural register as respective portions of the output multi-bit data item. The portions are defined by predicate data. Register allocation circuitry associates physical registers with the destination architectural register and the source architectural register(s). When detector circuitry detects that an instruction defines a predicated merge operation, the register allocation circuitry associates a further physical register with that instruction to store a copy of the prevailing contents. In response to a state of generated predicate data, predicate detector circuitry controls association of the further physical register with the instruction.

17 Claims, 8 Drawing Sheets

(56) References Cited

U.S. PATENT DOCUMENTS

| | | | |
|---|---|---|---|
| 2008/0177984 A1* | 7/2008 | Lataille | G06F 9/384 |
| | | | 712/E9.023 |
| 2012/0102301 A1 | 4/2012 | Gonion | |
| 2014/0122841 A1* | 5/2014 | Abernathy | G06F 9/30138 |
| | | | 712/225 |
| 2016/0179523 A1* | 6/2016 | Ould-Ahmed-Vall | |
| | | | G06F 9/30036 |
| | | | 712/221 |
| 2016/0328239 A1* | 11/2016 | Iyer | G06F 9/30112 |
| 2017/0109164 A1 | 4/2017 | Grochowski et al. | |
| 2018/0373539 A1* | 12/2018 | Fei | G06F 9/30123 |
| 2019/0129717 A1* | 5/2019 | Alexander | G06F 9/30181 |

OTHER PUBLICATIONS

International Search Report and Written Opinion of the International Searching Authority for PCT/GB2022/050704 dated Jun. 22, 2022, 16 pages.

* cited by examiner

CIRCUITRY AND METHOD FOR CONTROLLING A GENERATED ASSOCIATION OF A PHYSICAL REGISTER WITH A PREDICATED PROCESSING OPERATION BASED ON PREDICATE DATA STATE

BACKGROUND

This disclosure relates to circuitry and methods.

Some data processing arrangements allow for predicated processing operations such as so-called predicated merge operations. This term is typically (though not exclusively) applicable to vector processing operations performed by a data processor and concerns operations which propagate a set of zero or more portions or elements of the prevailing contents of a destination architectural register as respective portions of an output multi-bit data item, the set of portions being defined by so-called predicate data.

SUMMARY

In an example arrangement there is provided circuitry comprising:

a set of physical registers;

instruction decoder circuitry to decode processing instructions each generating an output multi-bit data item in a destination architectural register by applying a processing operation to one or more source data items in one or more respective source architectural registers, the decoder circuitry being configured to detect whether a processing instruction defines a predicated merge operation, being a processing operation which propagates a set of zero or more portions of the prevailing contents of the destination architectural register as respective portions of the output multi-bit data item, the set of portions being defined by predicate data;

register allocation circuitry to associate physical registers of the set of physical registers with the destination architectural register and the one or more source architectural registers and, when the detector circuitry detects that a processing instruction defines a predicated merge operation, the register allocation circuitry is configured to associate a further physical register with that processing instruction to store a copy of the prevailing contents of the destination architectural register;

predicate generation circuitry to generate the predicate data for use in the execution of a given processing instruction defining a predicated merge operation; and predicate detector circuitry to control association of the further physical register with the given processing instruction in response to a state of the predicate data generated by the predicate generation circuitry.

In another example arrangement there is provided a method comprising:

decoding processing instructions each generating an output multi-bit data item in a destination architectural register by applying a processing operation to one or more source data items in one or more respective source architectural registers, the decoding step comprising detecting whether a processing instruction defines a predicated merge operation, being a processing operation which propagates a set of zero or more portions of the prevailing contents of the destination architectural register as respective portions of the output multi-bit data item, the set of portions being defined by predicate data;

associating physical registers of a set of physical registers with the destination architectural register and the one or more source architectural registers and, when the detecting step detects that a processing instruction defines a predicated merge operation, the associating step is configured to associate a further physical register with that processing instruction to store a copy of the prevailing contents of the destination architectural register;

generating the predicate data for use in the execution of a given processing instruction defining a predicated merge operation; and controlling association of the further physical register with the given processing instruction in response to a state of the predicate data generated by the generating step.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Example Processing Circuitry

Figure 1:
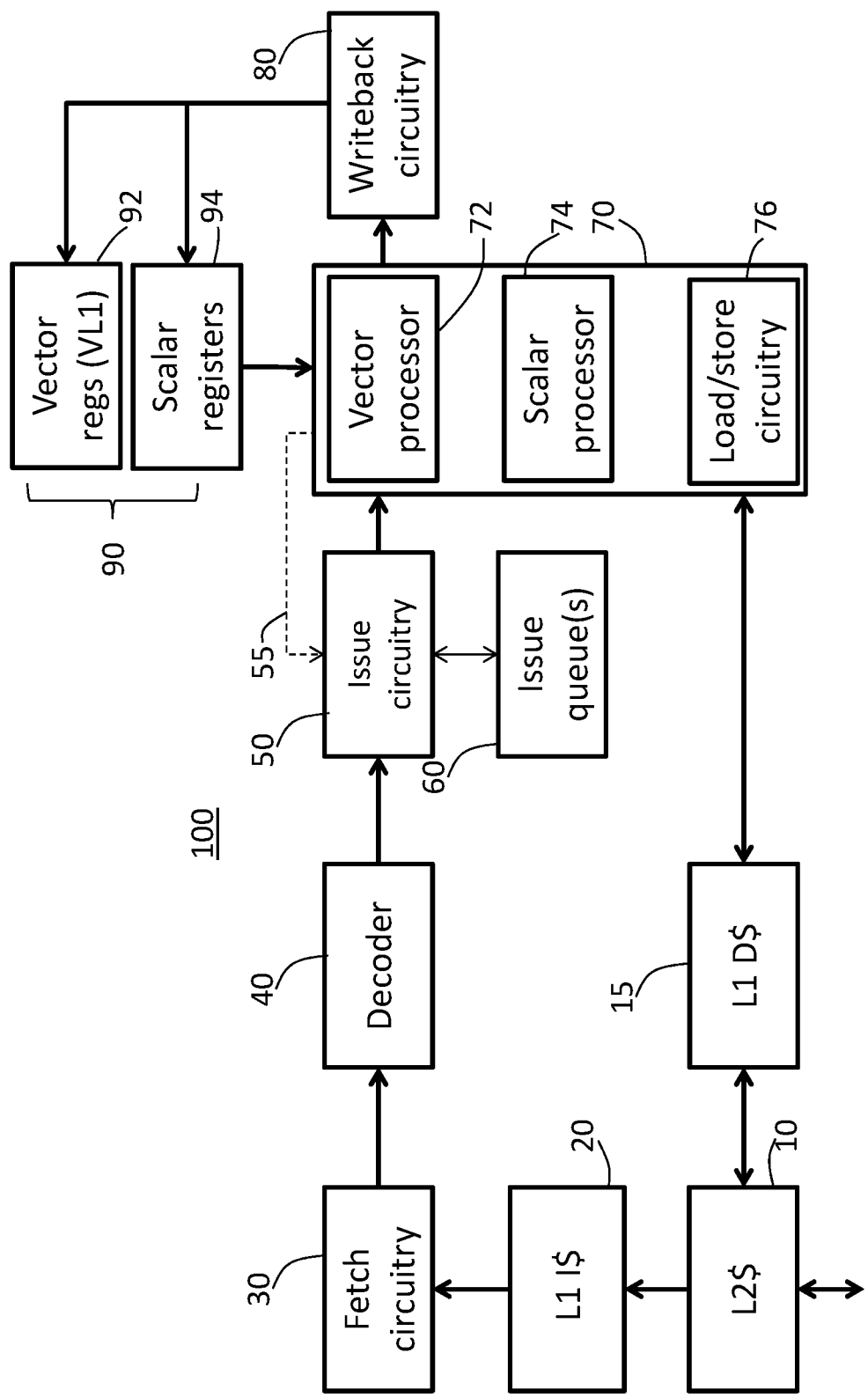
FIG. 1 schematically illustrates data processing circuitry.

FIG. 1 is a schematic diagram illustrating an example 100 of processing circuitry. Referring to FIG. 1, a level 2 cache 10 interfaces with a memory system (not shown). A level 1 instruction cache 20 provides a more localised cache of processing instructions and a level 1 data cache 15 provides a more localised cache of data to be retrieved from or stored to the memory system.

Fetch circuitry 30 fetches program instructions from the memory system via the various caches as drawn and provide fetched program instructions to decoder circuitry 40. The decoder circuitry 40 decodes the fetched program instructions and generates control signals to control a processing unit 70 to perform processing operations.

The decoded instructions are provided to issue circuitry 50 which maintains one or more issue queues 60 capable of holding or defining a plurality of instructions awaiting issue to the processing unit 70. As part of its operation, the issue/scheduler circuitry holds instructions in an issue queue until at least the stage at which all of the source operands required for execution of an instruction are ready which is to say they have been generated by the execution of earlier-executed instructions. The availability of results for use as source operands is communicated by the processing unit 70 to the issue circuitry 50 (e.g. scheduler circuitry), for example by a schematic data path 55.

The processing unit 70 may comprise various components, only three of which are shown in FIG. 1 for clarity of the diagram, namely a vector processor 72 to process vector processing instructions, a scalar processor 74 to handle scalar processing instructions and load/store circuitry 76 which communicates with the level 1 data cache 15 to retrieve source data and to store results generated by the processing unit 70.

A register file 90 is written to by writeback circuitry 80 in response to generation of a result by the vector processor 72 or the scalar processor 74. It can be read to provide source operands to the processing unit 70. The register file 90 comprises a set of physical vector registers 92 and a set of physical scalar registers 94. The physical vector registers have a vector length VL1. The vector length VL1 represents a number of so-called processing lanes provided by the vector processor 72, each processing lane applying the processing operation to respective data items of a vector of data items.

Architectural and Physical Registers

The register file 90 provides so-called physical registers. However, program code instructions for execution by the circuitry of FIG. 1 specify reads from and writes to a set of architectural registers specified by the relevant instruction set architecture. A process referred to as "register renaming" maps architectural registers to physical registers for execution of a given program code instruction.

The mapping of architectural registers to physical registers may take place at or in response to the decode stage performed by the decoder circuitry 40, for example. The decoder circuitry 40 detects, as part of the decoding process, how many architectural registers are defined by a particular decoded instruction and, in response to the detection, a corresponding number of physical registers are allocated for use by the processing unit 70 in execution of that instruction. The instruction itself is queued awaiting issue by the issue circuitry 50. One of the criteria which must be met before the instruction can be issued for execution (and before compliance the issue is inhibited) is that all of the mapped physical registers must be available, which is to say not currently in use in the execution of another instruction.

Therefore, the apparatus as discussed provides an example of execution circuitry 70 to execute processing instructions decoded by the instruction decoder circuitry; issue circuitry 50 to issue processing instructions to the execution circuitry for execution; in which the issue circuitry is configured to control issue of a processing instruction in dependence upon the availability of physical registers associated with that processing instruction.

Therefore, in example arrangements, a destination architectural register and one or more source architectural registers comprise respective architectural vector registers configured to store vectors of data items having a vector length representing a number of processing lanes, each lane applying the processing operation to respective data items of a vector of data items; and the set of physical registers comprises a set of physical vector registers configured to store vectors of data items having the vector length.

Predicated Processing Operations

So-called predicated processing or "predicate merge" operations will now be described. This term is typically applicable to vector processing operations performed by the vector processor 72 and concerns operations which propagate a set of zero or more portions or elements of the prevailing contents of a destination architectural register as respective portions of the output multi-bit data item, the set of portions being defined by so-called predicate data.

Examples of types of operation using predicate merge techniques may be found in the instruction set of processors using the so-called "Scalable Vector Extension" (SVE) or SVE2 architectures provided by Arm Ltd. A specific example is as follows:

ADD Z0.D, P0/M, Z1.D, Z2.D

This is an example of an addition operation which adds the active elements of architectural registers Z1 and Z2 holding source operands, putting the results into a destination register Z0. P0 is a predicate register which indicates those elements of the operands which are active and inactive. The suffix "M" after P0 indicates that any inactive elements will be merged. That is to say, any inactive elements of Z0 will remain at their original values (their prevailing values before execution of the operation).

Note that the predicate register may define any number or set of zero or more elements to be active. It is possible for a predicate register to define that all elements are active or alternatively to define that all elements are inactive. Any permutation of active elements between these extremes is also possible.

Note also that the add operation shown above is simply one of many possible examples of predicated merge operations.

Figure 2:
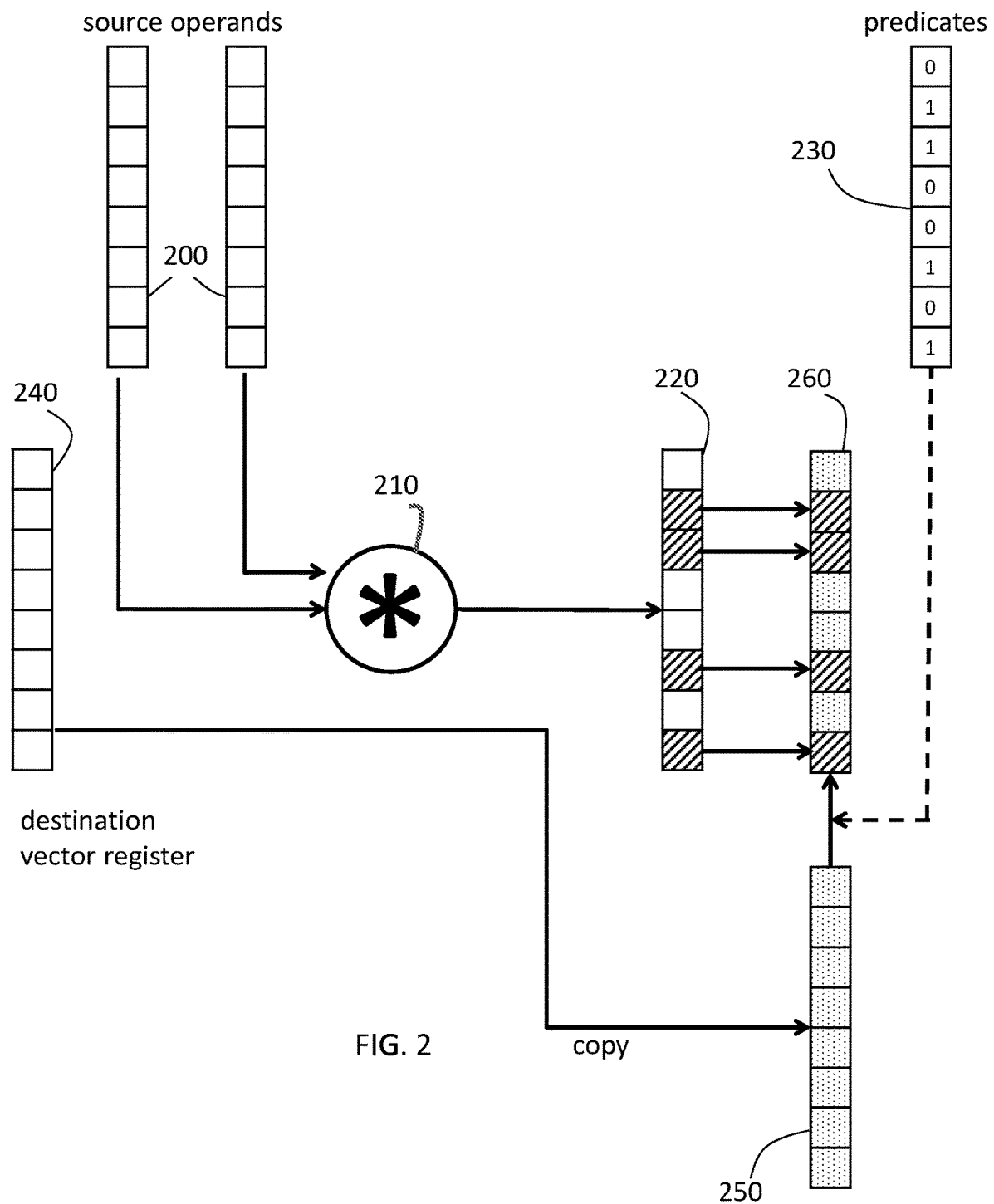
FIG. 2 schematically illustrates a predicated merge operation.

Referring to FIG. 2, an example predicated merge operation is shown in which a pair of inputs or source operands 200 are processed by an arbitrary operation 210 in dependence upon a set of predicates 230. In the example of FIG. 2, a notation is used in which respective elements of the various operands and predicates are shown in a vertical ordered orientation (so that each source operand has eight elements ordered in a vertical direction) and a predicate value of 0 at a particular position in the ordered set of eight predicate positions represents an inactive lane at that vector position. A predicate value of 1 represents an active lane.

One approach to handling predicated merge operations is as follows. A copy 250 is generated of the prevailing (pre-operation) contents of the destination vector register 240. The processing operation 210 is applied to the source operands to generate an intermediate result 220 for each processing lane, which is to say the intermediate result is independent of the prevailing predicates 230. The copy 250 and the intermediate result 220 are then written to the eventual destination register 260 in dependence upon the predicates 230. In FIG. 2, diagonal shading is used to indicate values from the intermediate result 220 which are written into the destination register 260. These correspond to values at vector positions at which the predicates 230 indicate that the lane is active. Other values written to the destination register 260 (at vector positions indicated by the predicates to be inactive) are from the copy 250 of the pre-operation contents of the destination vector register.

Therefore, in order to execute the example predicated merge operation discussed above, the following four register mappings have to be established:

Z0, Z1, Z2, [copy of prevailing contents of register mapped to Z0]

Example arrangements recognise that the need to map four physical registers for the execution of a predicated merge operation which intrinsically has only two source registers and one destination register can potentially introduce unnecessary latency into the processing operations, particularly in an example situation in which the predicates 230 have a prevailing state which indicates that the copy 250 of the pre-operation contents of the destination register will not be used. In other words, when the predicates 230 indicate that all elements or lanes are "active" then no information will be copied from the pre-operation contents of the destination register but instead each vector position will propagate the results 220 of the processing operation 210. Therefore, in examples to be discussed below, there is no need to provide the fourth mapped register to hold the copy of the prevailing contents of the destination vector register.

Therefore, in the example of FIG. 2, the execution circuitry 70 is configured to execute a processing instruction defining a predicated merge operation by storing a copy 250 of the prevailing contents of the destination architectural register 240 using the further physical register, generating all bits 220 of the output multi-bit data item for storage by the destination architectural register in dependence upon the one or more source data items and then propagating zero or more bits from the copy of the destination architectural register as respective portions (the dotted portions of 260 as drawn) of the output multi-bit data item in dependence upon the predicate data. In examples, for a processing instruction defining a predicated merge operation, each predicate value (element, bit or the like) indicates whether a respective portion of the prevailing contents of the destination architectural register will be propagated as a respective portion of the output multi-bit data item.

However, at the decoding stage of a given predicate merge instruction, in response to which the physical registers are mapped, the state of the predicates 230 (which will apply to the execution of that given predicate merge instruction) is not necessarily known yet.

Therefore, in some examples of the present techniques, an initial mapping of the additional physical register is provided but then, in response to the actual state of the predicates 230, the association of the further physical register with the given processing instruction defining a predicated merge operation may be removed (for example disabled, cancelled or otherwise invalidated) in response to a detection that the applicable predicate data indicates that no portions of the prevailing contents of the destination architectural register will be propagated as respective portions of the output multi-bit data item.

In other words, the additional register mapping required for predicated merge operation is allocated or reserved at the decode stage (at which stage the actual predicate has not yet been established) but may selectively then be removed at a later stage of processing once the actual predicate has been established. This measure can potentially improve throughput of processing instructions because a predicated merge instruction awaiting issue is (in the circumstances that the additional register mapping has been removed) no longer caused to wait for the availability of that additional register. In particular, in these examples, register allocation circuitry to be discussed below is configured to remove the association of the further physical register with a given processing instruction defining a predicated merge operation in response to a detection, by the predicate detector circuitry, that the predicate data generated by the predicate generation circuitry for that given processing instruction is equal to a predetermined value. For example, the predetermined value may be a value indicating that zero portions of the prevailing contents of the destination architectural register will be propagated as respective portions of the output multi-bit data item (in other words, all "active" predicates).

Predicates and Vector Lengths

Figure 3A:
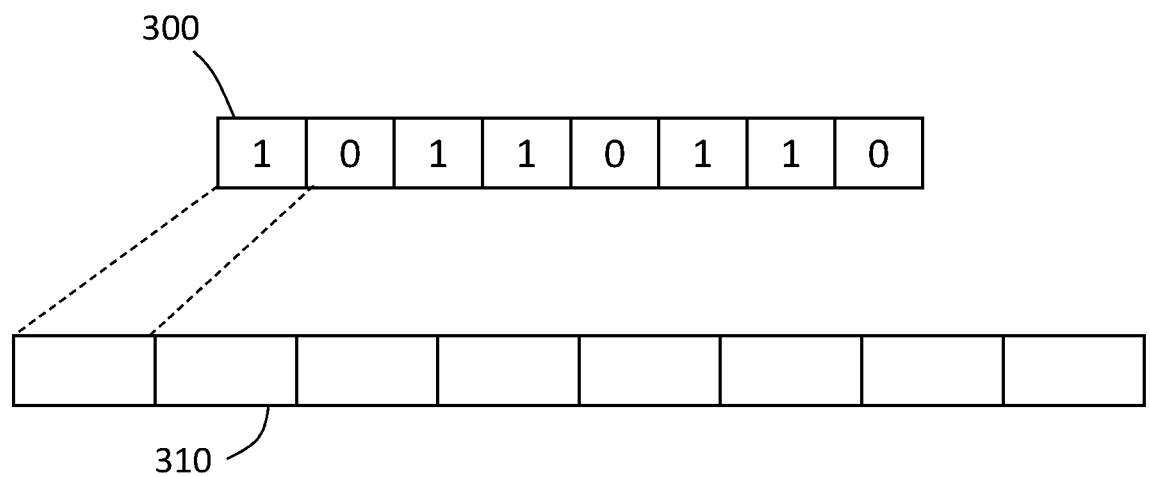
FIGS. 3A and 3B schematically illustrate different vector lengths and element sizes.

In the SVE and SVE2 systems discussed above, the vector length can be adaptively varied, for example in conjunction with a variation in the size, in bits, of each vector element. For example, the physical vector registers may each have a size of (say) 128 bits. This can be used with a vector length of (say) 8 to provide 16-bit elements 310 (FIG. 3A). If the vector length is set to (say) 4 then 32-bit elements 330 (FIG. 3B) may be used.

The predicate registers may be arranged to store one predicate bit (indicating active or inactive) for each of the greatest allowable number of vector elements, for which a number of predicate bits is equal to the physical vector register size in bits divided by the smallest permissible size of each vector element. For the purposes of this schematic discussion, assume that FIG. 3A represents the greatest allowable number of vector elements as 8, in which case each bit position of a predicate register 300 contains a predicate value applicable to a respective one of those vector elements 310.

Figure 3B:
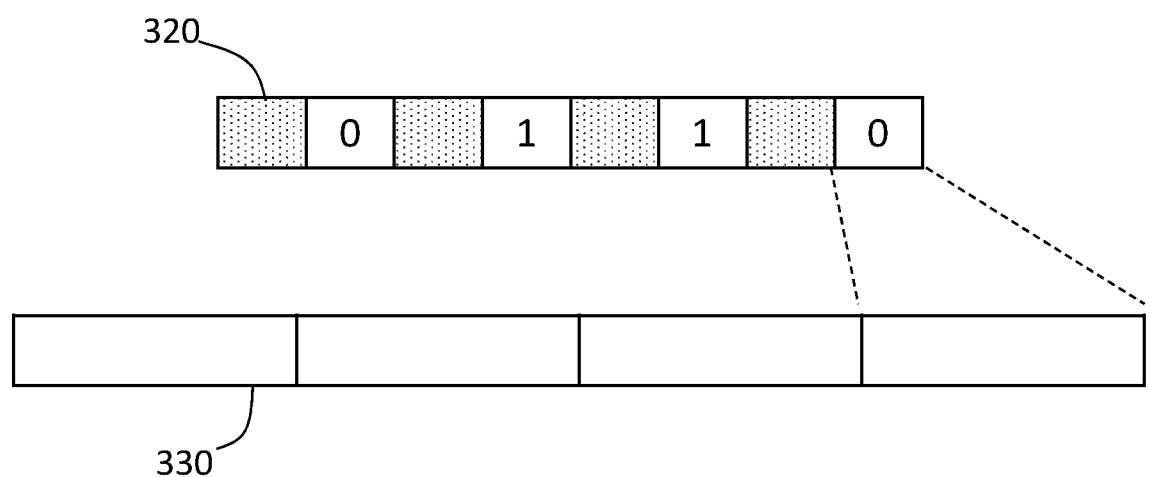

On the other hand, in FIG. 3B, the same physical vector register is partitioned into fewer, but larger, vector elements 330. Here, the predicate register is required only to store fewer predicate values (in this example, 4 values) so in this example, alternate positions within the predicate register 320 are used to store predicate values, with remaining positions (shown as shaded in FIG. 3B) being ignored or invalid. This is of course just one example of how the predicate register could be used in connection with different vector lengths.

The selection between the example arrangement of FIG. 3A and FIG. 3B can be performed under processing instruction control by at least some examples of an SVE or SVE2 enabled processor. In each case, or in other example cases not specifically shown in FIGS. 3A and 3B, the term "vector length" refers to the prevailing vector length in terms of the number of vector elements or processing lanes in use, and it is assumed that each such processing lane has an associated predicate value.

In either of the examples of FIGS. 3A and 3B (or in other variations as discussed above) the predicate data defines a number of predicate values equal to the vector length, even if that involves having unused elements in a predicate register.

Note however that the present technique is not dependent upon the scalable aspect of the SVE or SVE2 systems, but is applicable to any systems which can make use of predicated merge operations in the manner described.

Decoding, Renaming and Issue Process

Figure 4:
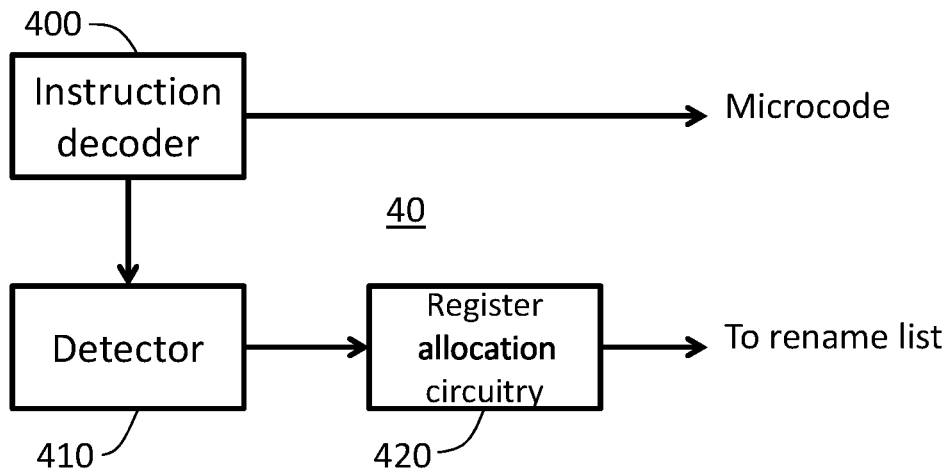
FIG. 4 schematically illustrates aspects of a decoding operation.

FIG. 4 schematically illustrates some aspects of the decoder circuitry 40 in which an instruction decoder 400 generates microcode for execution by the processing unit 70. A detector 410 detects a number of physical registers required to be mapped for execution of that instruction. In some instances, this will be equal to the number of architectural registers specified by the instruction, but in the case of predicated merge operations this will be equal to the number of architectural registers specified by the instruction plus one. This information is passed to register allocation circuitry 420 (e.g. register reservation circuitry) which populates a so-called rename list to be discussed below.

Figure 5:
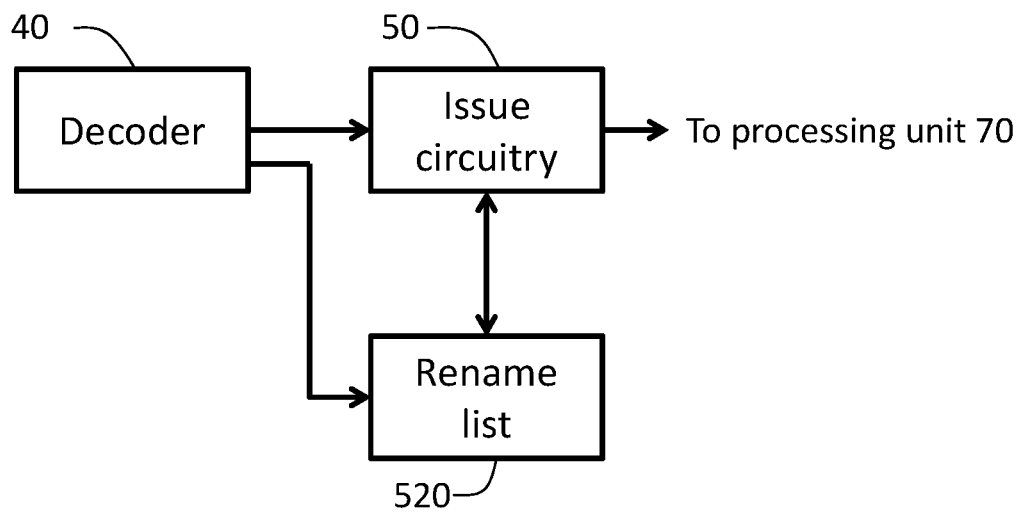
FIG. 5 schematically illustrates aspects of an issue operation.

Referring to FIG. 5, the microcode generated by the decoder 40 is passed to the issue circuitry 50 to be queued ready for issue. The issue circuitry is in communication with the rename list 520 and, as discussed above, receives information from the processing unit 70 which indicates directly or indirectly the availability of physical registers (for example either by indicating each register's availability or by indicating the completion of a preceding instruction which also involved a mapping to a particular physical register). Issue of a decoded instruction for execution is inhibited (for example prevented) until all of the physical registers specified by the rename list as being required for execution of that instruction are available.

Figures 6, 7A:
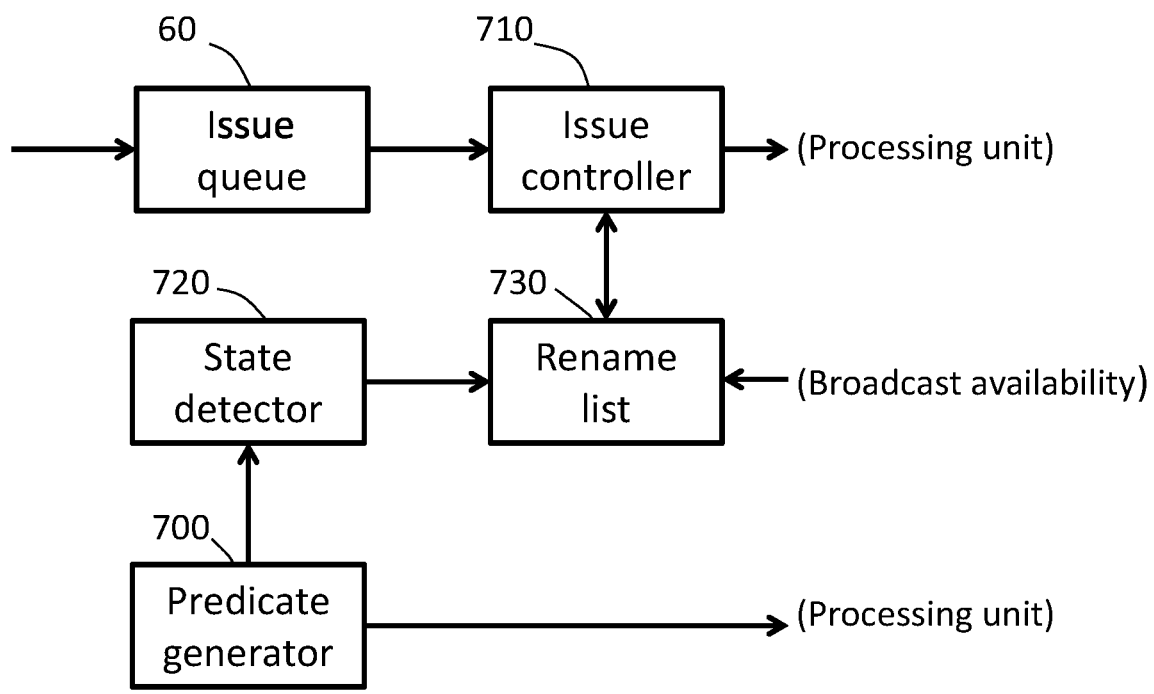
FIG. 6 schematically illustrates a rename list.
FIG. 7A schematically illustrates further aspects of an issue operation.

FIG. 6 schematically illustrates an example of a rename list in which respective entries are represented by horizontal rows, each providing an operation identifier, an identifier of a mapping required for different source and destination registers used by the instruction (including a further source register used in the case of a predicated merge operation), other operation information and valid flags. Here, a valid flag may be associated with each register mapping entry in the rename list. If the valid flag for a particular register mapping (or column as drawn) in the rename list is set to "valid" then that mapping is required and issue cannot take place until the mapped register is available. If the valid flag is set to "invalid" then the mapping defined by that entry is not required.

Further operations will now be described with reference to FIG. 7A.

The issue circuitry 50 comprises an issue controller 710 to interface with the instruction queue of issue queue(s) 60 and to provide queued instructions to the processing unit 70 for execution, with only those instructions being eligible for dispatch which have all of the register mappings defined by the rename list available.

The issue circuitry also provides a predicate generator 700 to generate the predicate data for use in execution of a queued instruction.

A state detector 720 detects the state of the predicate data generated by the predicate generator 700. Referring back to the examples of FIGS. 3A and 3B, in the case of predicates having some unused values such as the shaded elements shown in FIG. 3B, those unused values or elements are ignored in the detection made by the state detector 720.

When the state detector 720 detects that the predicate data indicates "all active", such that it is apparent that the additional copy of the destination register (pre-operation) will not be required, the state detector indicates to the rename list that the mapping of the additional register to serve as a copy of the destination register is not required, and the valid flag associated with that mapping is suppressed or in other words is set to "invalid". This has the effect of removing that mapping as discussed above and in turn avoids or removes the need for that particular mapped register to be available before the corresponding instruction can be issued for execution.

In-Order and Out-of-Order Processors

These techniques are applicable to so-called in-order and to so-called out-of-order processors. However, the techniques are particularly applicable to out-of-order processors in which instruction execution can rely on the availability of physical registers, such that it can be relevant to improving performance to provide for a potentially earlier availability of one or more physical registers.

In the case of an in-order processor, there may be less (or no) opportunity for situations to occur in which the techniques described here may improve performance, but they may still be useful for compatibility purposes, and they can be implemented without negatively affecting processing performance.

Further Variations

Normally, after issue, processing circuitry handling execution of a predicated merge instruction would read the predicate register upon which execution of that instruction depends. However, once the state detector 720 has detected "all active" predicates, there is in principle no need for the predicate register to be accessed but instead, at each relevant stage of execution, a dummy or proxy predicate can simply be generated having "all active" elements. This can be performed, for example, in response to flag or other data associated with the instruction when it is issued.

Figure 7B:
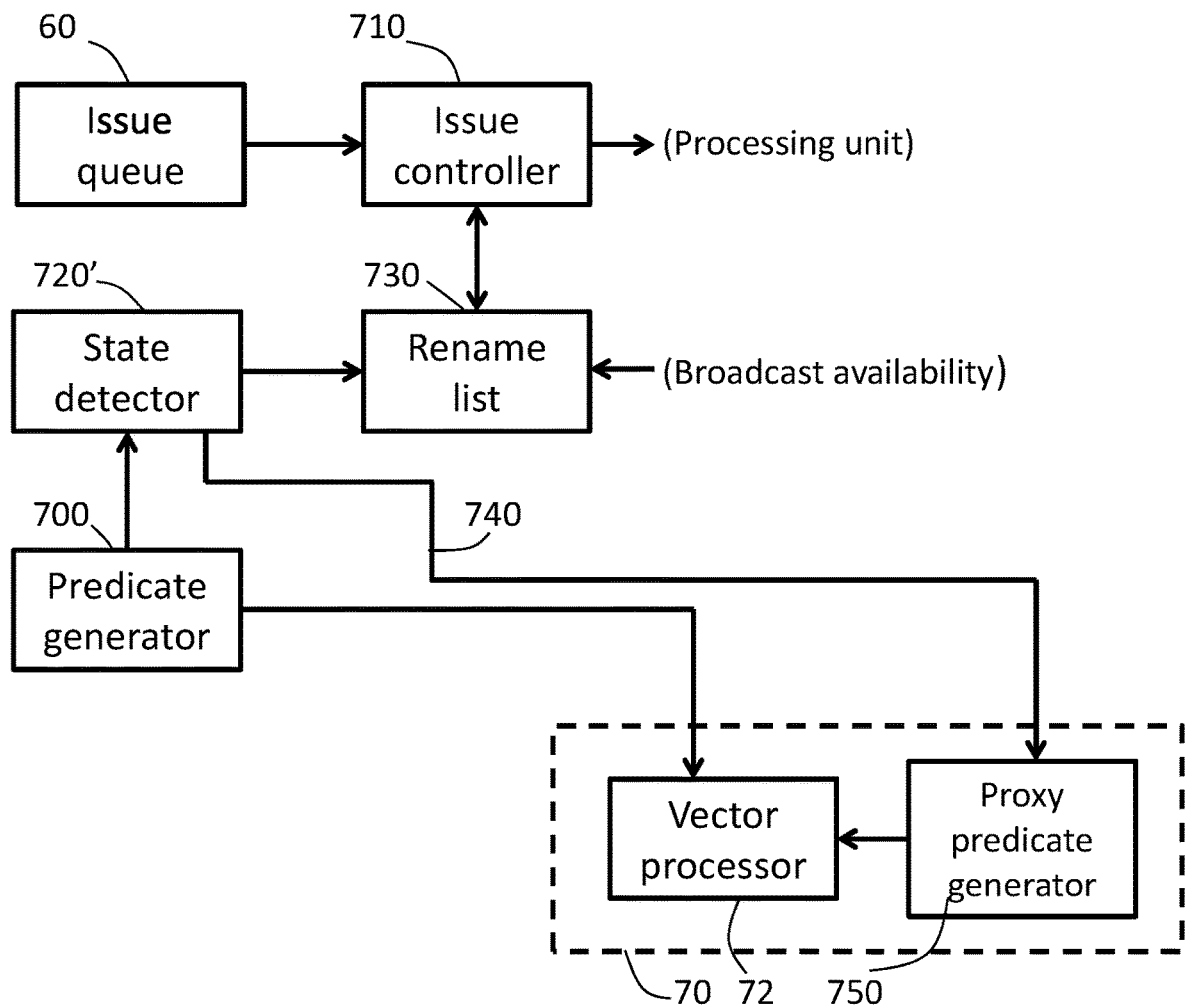
FIG. 7B schematically illustrates an alternative mode of operation.

An example of such an arrangement is shown in FIG. 7B. Here, the state detector 720' (or another part of, for example, the issue circuitry and/or the issue queue) provides a signal 740 to the processing unit indicating "all active" predicates. This provides an example in which the predicate detector circuitry is configured to communicate a signal indicating a state of the predicate data generated by the predicate generation circuitry to the execution circuitry. When this signal is received providing that indication, the processing unit can ignore the predicates actually generated by the predicate generator 700 but instead a proxy predicate generator 750 creates a set of "all active" predicates for use by the vector processor and supplies these to the vector processor at least in time for when they are required for execution of the associated instruction. This provides an example in which the execution (or processing) circuitry comprises circuitry (such as the proxy predicate generator 750) to generate substitute predicate data, for use by the execution circuitry in place of the predicate data generated by the predicate generation circuitry, in response to the signal indicating the state of the predicate data.

As mentioned above, this arrangement has one or both of the following advantages: (a) a predicate register file is not necessarily required to store the predicates generated by the predicate generator 700 until their use by the vector processor 70; this measure can in at least some cases potentially improve the availability of physical registers; and/or (b) a predicate read operation is not necessarily required by the vector processor 70 to access such stored predicates; this measure can in at least some cases potentially improve power consumption and/or execution speed.

For example, in order to potentially improve these aspects of operation, the signal 740 may comprise fewer elements than the predicates generated by the predicate generator 700 (which would typically comprise a number of elements or predicates equal to the prevailing vector length). For example, the signal 740 may comprise a single element indicative of the predicates being "all active" or "not all active". Similarly, rather than being stored in a register file (as the predicates would be) which then requires a register file read operation to retrieve, the signal 740 may be simply latched or otherwise transmitted to the proxy predicate generator 750 in a manner which does not require a time- and power-consuming register read operation.

Note that the proxy predicate register can either populate all "valid" locations of the set of locations 320 (FIG. 3B) in the predicate data, depending on the prevailing vector length, or could instead (for simplicity of implementation for example) populate all such locations 320, whether valid or invalid for the prevailing vector length, with a "1" or other indication of "active", such that any invalid locations would be ignored by the vector processor.

In the example discussed here, the signal 740 is generated and supplied only when the predicates are all active. This provides an example in which the predicate detector circuitry is configured to communicate the signal indicating the state of the predicate data generated by the predicate generation circuitry to the execution circuitry when the predicate data generated by the predicate generation circuitry is equal to a predetermined value indicating that zero portions of the prevailing contents of the destination architectural register will be propagated as respective portions of the output multi-bit data item.

Other Examples

The present techniques are not merely applicable to vector processing in which vectors of two or more elements are handled in parallel. The techniques are also applicable to vector execution in which each vector element is processed separately, for example as though it were a scalar operation, and to conditional scalar or vector operations such as those defined in respect of condition codes or flags set by a preceding or earlier instruction. Purely for the purposes of the present description, in such instances, such a condition code or flag may be considered to perform the function of predicate data.

Apparatus Overview

The apparatus discussed above provides an example of circuitry comprising:

a set of physical registers 90;

instruction decoder circuitry 40 to decode processing instructions each generating an output multi-bit data item in a destination architectural register by applying a processing operation to one or more source data items in one or more respective source architectural registers, the decoder circuitry being configured to detect 410 whether a processing instruction defines a predicated merge operation, being a processing operation which propagates a set of zero or more portions of the prevailing contents of the destination architectural register as respective portions of the output multi-bit data item, the set of portions being defined by predicate data;

register allocation circuitry 420 to associate (in the rename list 730) physical registers of the set of physical registers with the destination architectural register and the one or more source architectural registers and, when the detector circuitry detects that a processing instruction defines a predicated merge operation, the register allocation circuitry is configured to associate a further physical register with that processing instruction to store a copy of the prevailing contents of the destination architectural register;

predicate generation circuitry 700 to generate the predicate data for use in the execution of a given processing instruction defining a predicated merge operation; and predicate detector circuitry (e.g. state detector 720) to control association of the further physical register with the given processing instruction in response to a state of the predicate data generated by the predicate generation circuitry.

Method Example

Figure 8:
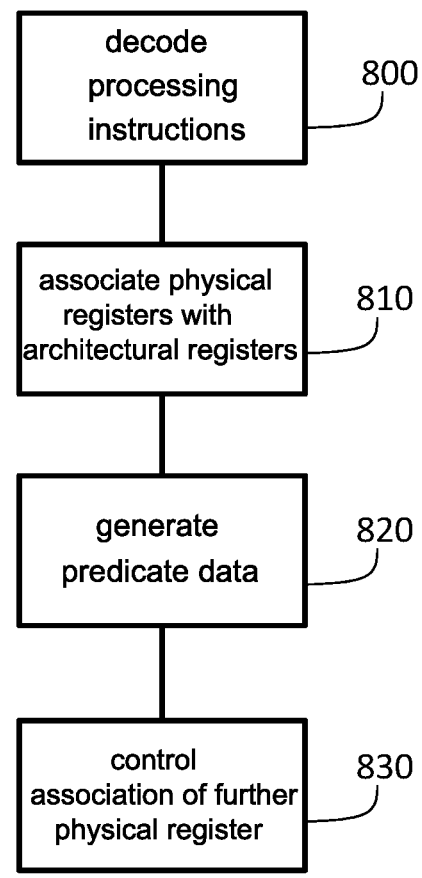
FIG. 8 is a schematic flowchart illustrating a method.

FIG. 8 is a schematic flowchart illustrating a method comprising:

decoding (at a step 800) processing instructions each generating an output multi-bit data item in a destination architectural register by applying a processing operation to one or more source data items in one or more respective source architectural registers, the decoding step comprising detecting whether a processing instruction defines a predicated merge operation, being a processing operation which propagates a set of zero or more portions of the prevailing contents of the destination architectural register as respective portions of the output multi-bit data item, the set of portions being defined by predicate data;

associating (at a step 810) physical registers of a set of physical registers with the destination architectural register and the one or more source architectural registers and, when the detecting step detects that a processing instruction defines a predicated merge operation, the associating step is configured to associate a further physical register with that processing instruction to store a copy of the prevailing contents of the destination architectural register;

generating (at a step 820) the predicate data for use in the execution of a given processing instruction defining a predicated merge operation; and controlling (at a step 830) association of the further physical register with the given processing instruction in response to a state of the predicate data generated by the generating step.

Simulator Embodiment

Figure 9:
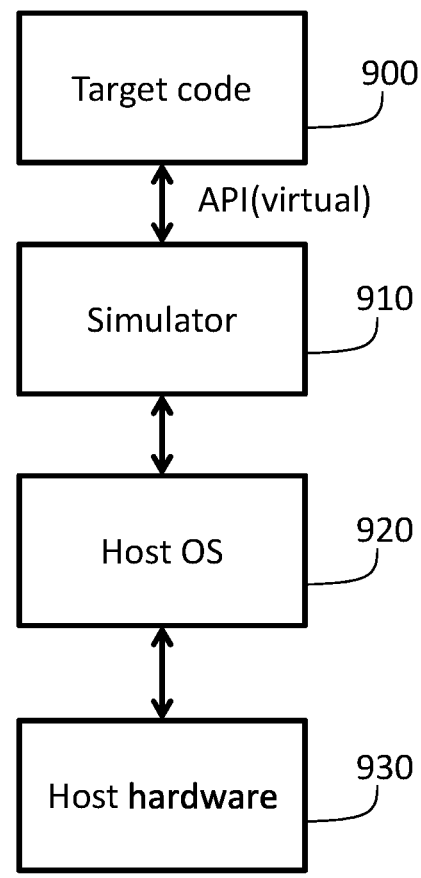
FIG. 9 schematically illustrates a simulator example.

FIG. 9 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host hardware 930 (e.g. a host processor), optionally running a host operating system 920, supporting the simulator program 910. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host hardware 930), some simulated embodiments may make use of the host hardware, where suitable.

The simulator program 910 may comprise instruction decoding program logic, register emulating program logic and address space mapping program logic for example and may be stored on a computer-readable storage medium (which may be a non-transitory medium), and provides a program interface (instruction execution environment) to the target code 900 (which may include applications, operating systems and a hypervisor) which is the same as the application program interface of the hardware architecture being modelled by the simulator program 910. Thus, the program instructions of the target code 900, including the features described above, may be executed from within the instruction execution environment using the simulator program 910, so that a host computer with host hardware 930 which does not actually have the hardware features of the apparatus discussed above can emulate these features.

The arrangement of FIG. 9, when used to simulate the operations described with reference to FIG. 8 for example, therefore provides an example of a computer program for controlling a host data processing apparatus to provide an instruction execution environment comprising:

a set of physical registers;

instruction decoder circuitry to decode processing instructions each generating an output multi-bit data item in a destination architectural register by applying a processing operation to one or more source data items in one or more respective source architectural registers, the decoder circuitry being configured to detect whether a processing instruction defines a predicated merge operation, being a processing operation which propagates a set of zero or more portions of the prevailing contents of the destination architectural register as respective portions of the output multi-bit data item, the set of portions being defined by predicate data;

register allocation circuitry to associate physical registers of the set of physical registers with the destination architectural register and the one or more source architectural registers and, when the detector circuitry detects that a processing instruction defines a predicated merge operation, the register allocation circuitry is configured to associate a further physical register with that processing instruction to store a copy of the prevailing contents of the destination architectural register;

predicate generation circuitry to generate the predicate data for use in the execution of a given processing instruction defining a predicated merge operation; and predicate detector circuitry to control association of the further physical register with the given processing instruction in response to a state of the predicate data generated by the predicate generation circuitry.

General Matters

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Circuitry comprising:

a set of hardware physical registers;

instruction decoder circuitry to decode processing instructions, wherein a given processing instruction of the processing instructions generates an output multi-bit data item in a destination architectural register by applying a processing operation to one or more source data items in one or more respective source architectural registers, the instruction decoder circuitry being configured to detect whether the given processing instruction defines a predicated merge operation, which propagates a set of zero or more portions of prevailing contents of the destination architectural register as respective portions of the output multi-bit data item, the set of zero or more portions being defined by predicate data;

register allocation circuitry to associate hardware physical registers of the set of hardware physical registers with the destination architectural register and the one or more source architectural registers and, when the instruction decoder circuitry detects that the given processing instruction defines the predicated merge operation, the register allocation circuitry is configured to generate an association of a further hardware physical register with the given processing instruction to store a copy of the prevailing contents of the destination architectural register;

predicate generation circuitry to generate the predicate data for use in execution of the given processing instruction defining the predicated merge operation; and predicate detector circuitry to control the association of the further hardware physical register with the given processing instruction in response to a state of the predicate data generated by the predicate generation circuitry.

2. The circuitry of claim 1, comprising:

execution circuitry to execute the processing instructions decoded by the instruction decoder circuitry; and issue circuitry to issue the processing instructions to the execution circuitry for execution;

in which the issue circuitry is configured to control issue of a processing instruction in dependence upon an availability of hardware physical registers associated with that processing instruction.

3. The circuitry of claim 2, in which the execution circuitry is configured to execute the given processing instruction defining the predicated merge operation by storing a copy of the prevailing contents of the destination architectural register using the further hardware physical register, generating bits of the output multi-bit data item for storage by the destination architectural register in dependence upon the one or more source data items and then propagating zero or more bits from the copy of the prevailing contents of the destination architectural register as the respective portions of the output multi-bit data item in dependence upon the predicate data.

4. The circuitry of claim 2, in which the issue circuitry comprises an issue queue to store data defining a plurality of processing instructions awaiting issue.

5. The circuitry of claim 4, in which the issue circuitry is configured to inhibit issue of the given a-processing instruction from the issue queue until all hardware physical registers of the set of hardware physical registers that are associated with the given processing instruction are available.

6. The circuitry of claim 2, in which the predicate detector circuitry is configured to communicate a signal indicating the state of the predicate data generated by the predicate generation circuitry to the execution circuitry.

7. The circuitry of claim 6, in which the execution circuitry comprises proxy predicate generation circuitry to generate substitute predicate data, for use by the execution circuitry in place of the predicate data generated by the predicate generation circuitry, in response to the signal indicating the state of the predicate data.

8. The circuitry of claim 7, in which the predicate detector circuitry is configured to communicate the signal indicating the state of the predicate data generated by the predicate generation circuitry to the execution circuitry when the predicate data generated by the predicate generation circuitry is equal to a predetermined value indicating that zero portions of the prevailing contents of the destination architectural register will be propagated as respective portions of the output multi-bit data item.

9. The circuitry of claim 1, in which the register allocation circuitry is configured to remove the association of the further hardware physical register with the given processing instruction defining the predicated merge operation in response to a detection, by the predicate detector circuitry, that the predicate data generated by the predicate generation circuitry for the given processing instruction is equal to a predetermined value.

10. The circuitry of claim 9, in which the predetermined value is a value indicating that zero portions of the prevailing contents of the destination architectural register will be propagated as the respective portions of the output multi-bit data item.

11. The circuitry of claim 1, in which:
the processing instructions include vector processing instructions.

12. The circuitry of claim 11, in which:
the destination architectural register and the one or more source architectural registers comprise respective architectural vector registers configured to store vectors of data items having a vector length representing a number of processing lanes, each processing lane applying the processing operation to respective data items of a vector of data items; and
the set of hardware physical registers comprises a set of hardware physical vector registers configured to store the vectors of data items having the vector length.

13. The circuitry of claim 12, in which the predicate data defines a number of predicate values equal to the vector length.

14. The circuitry of claim 13, in which, for the given processing instruction defining the predicated merge operation, each predicate value indicates whether a respective portion of the prevailing contents of the destination architectural register will be propagated as a respective portion of the output multi-bit data item.

15. The circuitry of claim 13, in which the register allocation circuitry is configured to remove the association of the further hardware physical register with the given processing instruction defining the predicated merge operation in response to a detection, by the predicate detector circuitry, that the predicate data generated by the predicate generation circuitry indicates that no portions of the prevailing contents of the destination architectural register will be propagated as the respective portions of the output multi-bit data item.

16. A method comprising:
decoding processing instructions, wherein a given processing instruction of the processing instructions generates an output multi-bit data item in a destination architectural register by applying a processing operation to one or more source data items in one or more respective source architectural registers, the decoding step comprising detecting whether the given processing instruction defines a predicated merge operation, which propagates a set of zero or more portions of prevailing contents of the destination architectural register as respective portions of the output multi-bit data item, the set of zero or more portions being defined by predicate data;
associating hardware physical registers of a set of hardware physical registers with the destination architectural register and the one or more source architectural registers and, when the detecting step detects that the given processing instruction defines the predicated merge operation, the associating step is configured to generate an association of a further hardware physical register with the given processing instruction to store a copy of the prevailing contents of the destination architectural register;
generating the predicate data for use in execution of the given processing instruction defining the predicated merge operation; and
controlling the association of the further hardware physical register with the given processing instruction in response to a state of the predicate data generated by the generating step.

17. A non-transitory, computer-readable storage medium storing a computer program for controlling a host data processing apparatus to provide an instruction execution environment comprising:
a set of hardware physical registers;
instruction decoder circuitry to decode processing instructions, wherein a given processing instruction of the processing instructions generates an output multi-bit data item in a destination architectural register by applying a processing operation to one or more source data items in one or more respective source architectural registers, the instruction decoder circuitry being configured to detect whether the given processing instruction defines a predicated merge operation, which propagates a set of zero or more portions of prevailing contents of the destination architectural register as respective portions of the output multi-bit data item, the set of zero or more portions being defined by predicate data;
register allocation circuitry to associate hardware physical registers of the set of hardware physical registers with the destination architectural register and the one or more source architectural registers and, when the instruction decoder circuitry detects that the given processing instruction defines the predicated merge operation, the register allocation circuitry is configured to generate an association of a further hardware physical register with the given processing instruction to store a copy of the prevailing contents of the destination architectural register;
predicate generation circuitry to generate the predicate data for use in execution of the given processing instruction defining the predicated merge operation; and
predicate detector circuitry to control the association of the further hardware physical register with the given processing instruction in response to a state of the predicate data generated by the predicate generation circuitry.

* * * * *